April 15, 1952  A. B. HANN  2,592,689
ELECTRICALLY CONTROLLED PLANT CHOPPING MACHINE
Filed July 16, 1948  3 Sheets-Sheet 1

Arthur B. Hann
INVENTOR.

April 15, 1952     A. B. HANN     2,592,689
ELECTRICALLY CONTROLLED PLANT CHOPPING MACHINE
Filed July 16, 1948     3 Sheets-Sheet 2
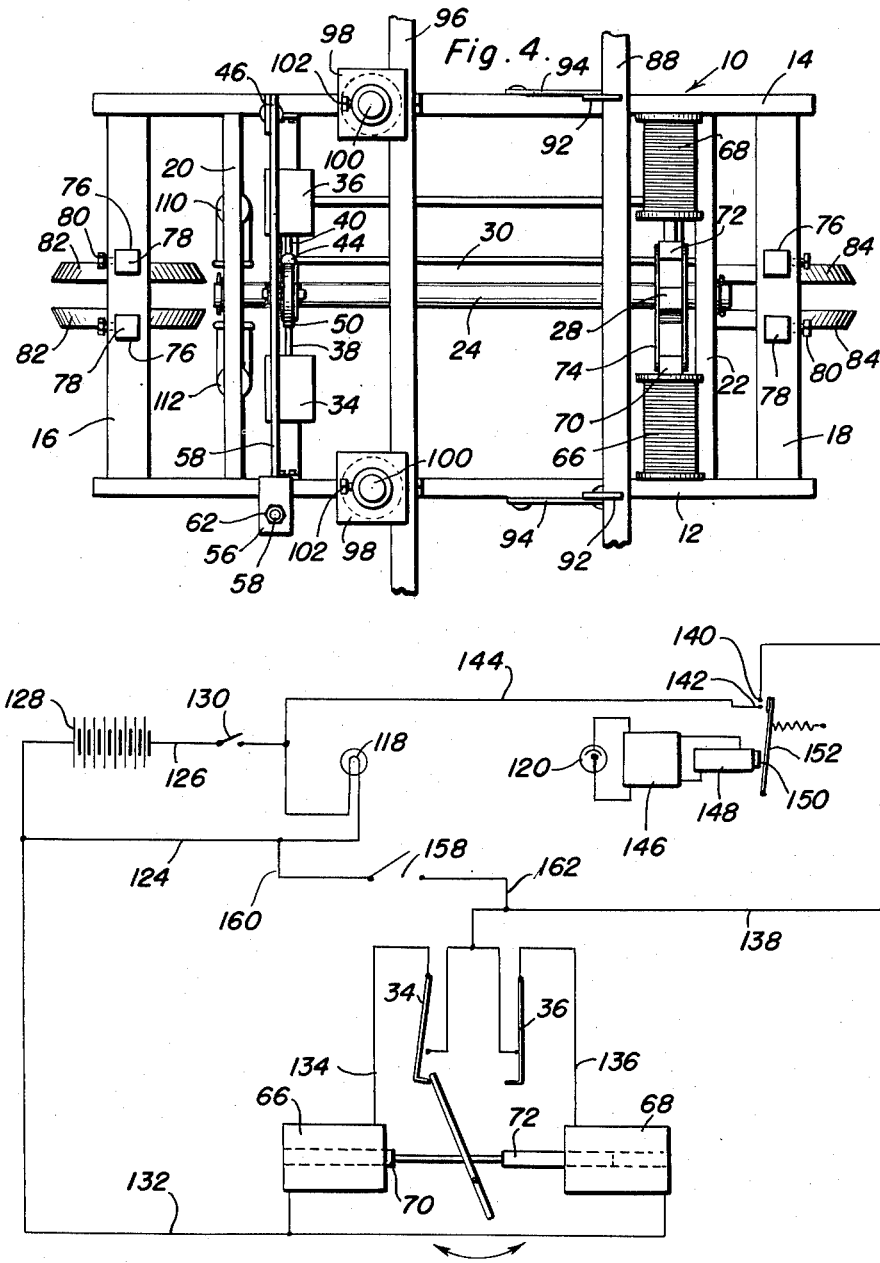
Arthur B. Hann
INVENTOR.

Arthur B. Hann
INVENTOR.

Patented Apr. 15, 1952

2,592,689

UNITED STATES PATENT OFFICE 2,592,689

ELECTRICALLY CONTROLLED PLANT CHOPPING MACHINE

Arthur B. Hann, Parma, Idaho

Application July 16, 1948, Serial No. 38,980

5 Claims. (Cl. 97—18)

This invention relates to new and useful improvements in agricultural machines and the primary object of the present invention is to provide an oscillatory cutter or plant engaging member and embodying novel and improved means for actuating said cutter in a pendulous action periodically.

Another important object of the present invention is to provide an oscillating blade for thinning, hoeing or weeding operations, a pair of actuating members for actuating said oscillating blade periodically, and a light sensitive cell or photoelectric cell for activating said members alternatively to move the blade back and forth.

A further object of the present invention is to provide a crop thinner, beet topper and the like including a frame having pairs of spaced guide wheels that will straddle a plant as the frame is moved over a ground surface.

A still further aim of the present invention is to provide a device for topping, thinning or weeding plants that is simple and practical in construction, strong and reliable in use, small and compact in structure, durable and efficient in operation, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 4 is a top plan view of Figure 1, and showing the tractor cultivator bars in part;

Figure 5 is a schematic view showing the circuit used in conjunction with the present invention;

Figure 1:
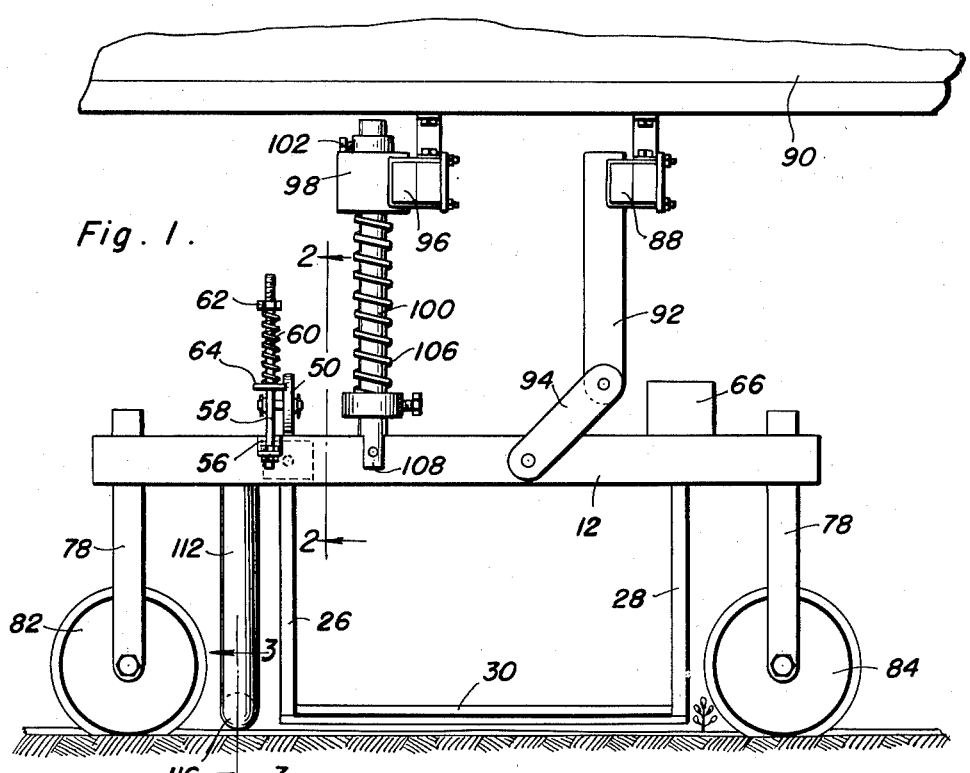
Figure 1 is a side elevational view of the present invention, and showing the same applied to a portion of a tractor.

Referring now to the drawings in detail, wherein for the purpose of illustration, there is disclosed a preferred embodiment of the present invention, the numeral 10 represents a substantially rectangular frame generally including a pair of spaced parallel side rails 12 and 14 the ends of which are connected by cross bars 16 and 18.

Rotatably supported by a pair of spaced parallel, transverse bars 20 and 22 that are fixed between the rails 12 and 14, is a longitudinal shaft 24 to which there is fixedly mounted a pair of oscillatory members 26 and 28.

A longitudinal cutter, blade, land or plant engaging member 30 is fixed to the lower terminals of the members 26 and 28 and will move in a pendulus action with the members 26 and 28.

A pair of angle member or L-shaped brackets 30 and 32 are fixed at their shorter legs to the inner faces of the members 26 and 28 and support a pair of electrically operated switches 34 and 36 having operating rods 38 and 40 which are normally disposed outwardly by resilient means in a circuit closing position.

The outer extremities of the rods 38 and 40 are integrally formed with spherical elements or bearing members 42 and 44.

Figure 2:
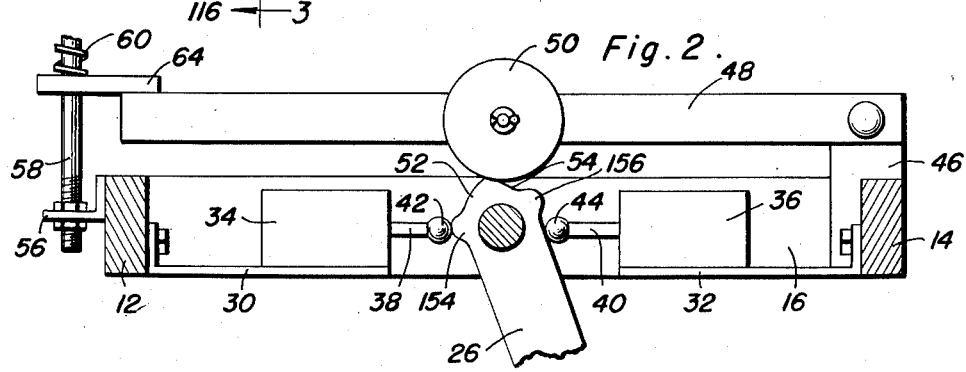
Figure 2 is an enlarged transverse vertical sectional view taken substantially on the plane of section line 2—2 of Figure 1.
Figure 3:
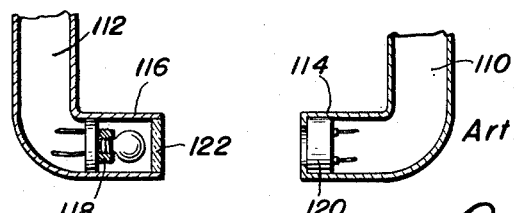
Figure 3 is an enlarged transverse vertical sectional view taken substantially on the plane of section line 3—3 of Figure 1.
Figure 6:
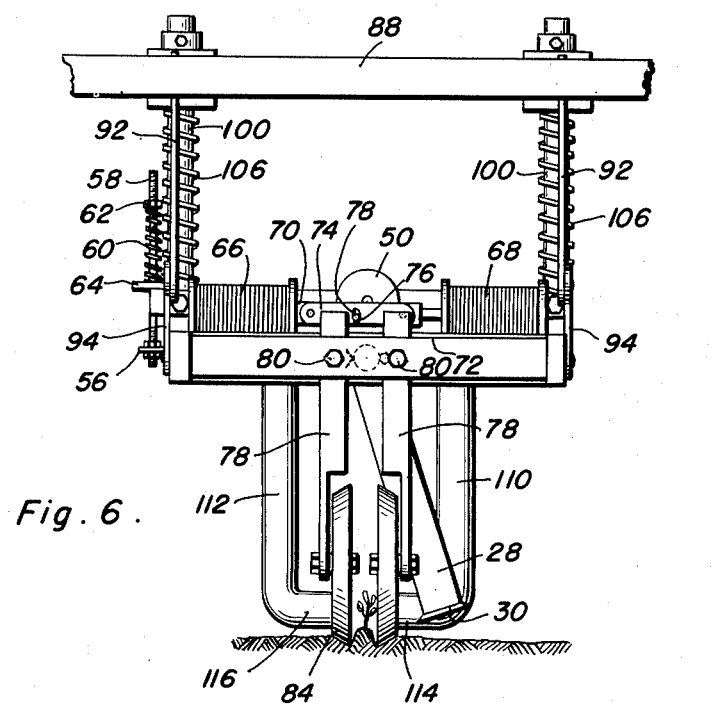
Figure 6 is a rear elevational view of Figure 1.
Figure 7:
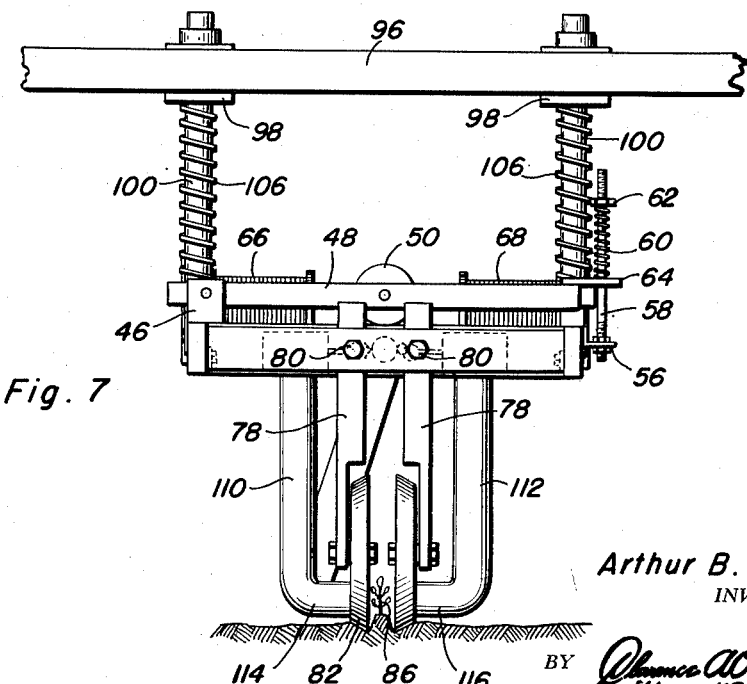
Figure 7 is a front elevational view of Figure 1.

An ear 46 projects upwardly from the bar 14 and pivotally engages a transverse support bar or arm 48 that rotatably supports a bearing disk or wheel 50 which is engageable with the upwardly converging cam surfaces 52 and 54 at the upper terminal of the member 26, as shown best in Figure 2 of the drawings.

An angle member 56 is fixed to the side rail 12 and adjustably supports a post or rod 58. A coil spring 60 embraces the rod 58 and is biased between a nut 62 receivably engaged on the upper externally threaded terminal of the rod 58 and a pressure plate 64 that is slidably mounted on the rod 58 and which bears against the free end of the support 48 to urge the disk 50 against one cam surface of the member 26, either 52 or 54.

Fixed to the inner faces of the side rails 12 and 14, are the base portions of a pair of conventional and known solenoids 66 and 68 having operating cores 70 and 72 that are pivotally connected by links 74.

The upper terminal of the member 28 is provided with an outwardly projecting pin 76 the ends of which engage slots 78 provided in the links 74 whereby the members 26 and 28 will be oscillated in a pendulous action as the cores 70 and 72 are alternately actuated or retracted.

Slidably engaging a spaced pair of substantially square vertical openings 74 provided in the cross bar 16, are square shanks 78 that are adjustable vertically by set screws 80 carried by the bars 16 and 18. The shanks 78 carried by the bar 16 rotatably support a pair of spaced parallel forward or leading guide wheels 82, and the shanks 78 carried by the bar 18 rotatably support a pair of spaced parallel, rear guide wheels 84.

The wheels 82 and 84 are so arranged that the same will straddle a row of plants 86 and the said wheels are beveled to prevent slipping thereof when the same are in motion.

Depending from the rear cultivator bar 88 of a tractor or the like 90, is a pair of arms or fixed links 92 that are connected to the side rails 12 and 14 by pitmans 94.

Fixed to the forward cultivator bar 96 is a pair of guide blocks 98 that slidably engage a pair of rods 100 which are vertically adjustable by set screws 102 carried by the said blocks 98.

Slidably and adjustably mounted on the rods 100 are bearing members or blocks 104 that engage the lower terminals of coil springs 106 which embrace the rods 100 and which are biased between the blocks 98 and bearing member 104. The lower terminals of the rods 100 are bifurcated as at 108 and pivotally engage the side rails 12 and 14.

Suitably fixed to and depending from the cross bar 20, is a pair of tubular elements or conduits 110 and 112 having angulated end portions 114 and 116. A focus lamp 118 is mounted in the portion 116 and directs light rays to a light sensitive unit 120 that is mounted in the portion 114. A magnifying plate or lens 122 being mounted in the portion 116 magnifies the light rays passing from the lamp 118 to the unit 120 as is conventional for photoelectric cells commonly referred to as an "electric eye."

As best shown in Figure 5 of the drawings, the lamp 118 is connected by wires 124 and 126 to a suitable source of electric current 128 and a switch 130 controls the circuit from the lamp 118 to the source 128.

A further wire 132 is electrically connected to one terminal of each solenoid 66 and 68 and the remaining terminals of the solenoids 66 and 68 are connected to one terminal of each switch 34 and 36 by wires 134 and 136.

The remaining terminals of the switches 34 and 36 are connected by a wire 138 to a contact point 140 that is spaced relative to a further control point 142 which is connected to the wire 126 by another wire 144.

An amplifier 146 is electrically connected to the sensitive unit 20 and a solenoid 148 is connected to the amplifier 146. This solenoid 148 includes an operating core 150 which is engageable with a spring retracted lever or contact member 152 that bridges the gap between the contacts 140 and 142 when the core 150 is moved outwardly due to the breaking of the circuit to the solenoid.

In practical use of the present invention, the lamp 118 is energized by actuating the master switch 130 and the sensitive unit 120 is energized by the radiations emitted by the lamp 118 and current is fed to the amplifier 146 normally retracting the operating core 150.

When a plant 86 breaks the light rays emitted from the lamp 118 to the sensitive unit 120, the circuit to the amplifier 146 will open and the operating core 150 will be actuated to move the lever 152 completing the circuit to switches 34 and 36. The members 26 and 28 will normally be disposed in a vertically inclined position as shown in Figure 2 with the disk 50 bearing upon the cam surface 54 and the cam 54 integral with the member 26 engages the element 42 to force the arm 38 inwardly. Since the circuit to the solenoid 66 is broken the operating core 70 will be actuated to force the members 26 and 28 in a pendulous action so that the members 26 and 28 will then be retained in a vertical inclined position so that the cam surface 52 will engage the wheel 50.

The next plant blocking the light rays to the sensitive unit 120 will then actuate the core 72 of the solenoid 68 and the members 26 and 28 will return to that position shown in Figure 2 with the cam surface 54 engaging the disk 50.

The back and forth swinging motion of the cutter will continue as successive plants are disposed between the lamp 118 and sensitive unit 120.

In order that the cutter may be controlled to oscillate at any desired time and length of time, there is provided a push type switch 158, of any conventional form, that is connected to the lines 124 and 138 by wires 160 and 162 to by-pass the switch elements 140 and 142 as well as the amplifier 146. When the spring urged bottom for the switch 158 is pressed and held inwardly, the circuit to the switches 34 and 36 is completed and the cutter will be oscillated in the manner previously described.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. In an agricultural machine, a wheeled frame, a longitudinal shaft carried by said frame, a pair of members vertically pivotally attached to said shaft, a blade carried by said members, a pair of solenoids carried by said frame for actuating said members in a pendulous action periodically, one of said members having a cam surface, means carried by said frame engaging said cam surface to normally retain said members in a vertically inclined position, and light sensitive means responsive to a plant for controlling said solenoids, said cam engaging means including a pivotal support carried by said frame, a bearing disk carried by said support engaging said cam surface, and resilient means yieldingly urging said disk against said cam surface.

2. In an agricultural machine, a wheeled frame, a support pivotally mounted on said frame for vertical oscillatory movement, a blade mounted on said support, a pair of solenoids carried by the frame for actuating said support in a pendulous action periodically, said support having a cam surface, means carried by the frame engaging the cam surface to normally retain the support in a vertically inclined position, and light sensitive means responsive to a plant for controlling said solenoids.

3. In an agricultural machine, a wheeled frame, a tool support pivotally mounted on said frame for vertical oscillatory movement, a horizontally reciprocable member mounted on the frame and connected to the support for oscillating the support, and electrical means connected to the member and actuated by the support for imparting reciprocable movement to the member, said means including a switch arm and a cam carried by said support engaging said arm.

4. In an agricultural machine, a wheeled frame, a vertically swingable tool support carried by the frame, a pair of solenoids mounted on the frame and including operating cores connected to said support for imparting swinging movement to said support, a pair of switches mounted on said frame and electrically connected to a source of current and to said solenoids, and means carried by said support for selectively actuating said switches.

5. In an agricultural machine, a wheeled frame, a tool support pivotally mounted on said frame for vertical oscillatory movement, a pivotally reciprocable member mounted on the frame and connected to the support for oscillating the support, and electrical means connected to the member and actuated by the support for imparting reciprocable movement to the member, said support including a cam surface and means slidably carried by the frame and overlying and engaging said cam surface tending to retain the supports in a vertically inclined position.

ARTHUR B. HANN.

REFERENCES CITED

The following references are of record in the file of this patent:

UNITED STATES PATENTS

| Number | Name | Date |
|---|---|---|
| 886,179 | Bragunier et al. | Apr. 28, 1908 |
| 1,270,453 | Smith | June 25, 1918 |
| 1,303,798 | Janes | May 13, 1919 |
| 1,519,198 | Frank | Dec. 16, 1924 |
| 1,736,127 | Morris | Nov. 19, 1929 |
| 2,177,803 | Ferte et al. | Oct. 31, 1939 |
| 2,400,562 | Marihart | May 21, 1946 |